United States Patent [19]
Ogata

[11] Patent Number: 5,982,544
[45] Date of Patent: Nov. 9, 1999

[54] ZOOM LENS SYSTEM HAVING A DIFFRACTIVE SURFACE

[75] Inventor: Yasuji Ogata, Akiruno, Japan

[73] Assignee: Olympus Optical Co., Ltd., Tokyo, Japan

[21] Appl. No.: 09/109,416

[22] Filed: Jul. 2, 1998

[30] Foreign Application Priority Data

Jul. 3, 1997 [JP] Japan .................................. 9-178424

[51] Int. Cl.[6] ............................ G02B 27/44; G02B 5/18; G02B 3/08; G02B 15/14

[52] U.S. Cl. ........................ 359/565; 359/570; 359/743; 359/689

[58] Field of Search .................................. 359/565, 570, 359/571, 575, 19, 15, 743, 742, 680, 566

[56] References Cited

U.S. PATENT DOCUMENTS

| | | | |
|---|---|---|---|
| 5,148,314 | 9/1992 | Chen | 359/565 |
| 5,268,790 | 12/1993 | Chen | 359/565 |
| 5,543,966 | 8/1996 | Meyers . | |

FOREIGN PATENT DOCUMENTS 5-173069  7/1993  Japan .

OTHER PUBLICATIONS

Thomas Stone, et al., "Hybrid diffractive–refractive lenses and achromats", Applied Optics, Jul. 15, 1998, vol. 27, No. 14, pp. 2960–2971.

Mark M. Meyers, "Diffractive optics at Eastman Kodak Company", SPIE, (1996), vol. 2689, pp. 228–254.

*Primary Examiner*—Jon Henry
*Attorney, Agent, or Firm*—Pillsbury Madison & Sutro LLP

[57] ABSTRACT

The invention provides a compact yet high-zoom-ratio zoom lens system for use with lens shutter cameras, which is well corrected for aberrations albeit being made up of a small number of lenses. The zoom lens comprises a first lens group G1 of positive refracting power, a second lens group G2 of positive refractive power and a third lens group G3 of negative refracting power. The lens groups move for zooming from the wide angle side to the telephoto side, with a separation between the first and second lens groups becoming wide and a separation between the second and third lens groups becoming narrow. At least one lens group has a diffractive surface therein, and satisfies $1.8 < \beta_T/\beta_W < 4.0$ where $\beta_T$ and $\beta_W$ are transverse magnifications of the lens group having a diffractive surface at the wide-angle end and the telephoto end of the lens system.

10 Claims, 7 Drawing Sheets

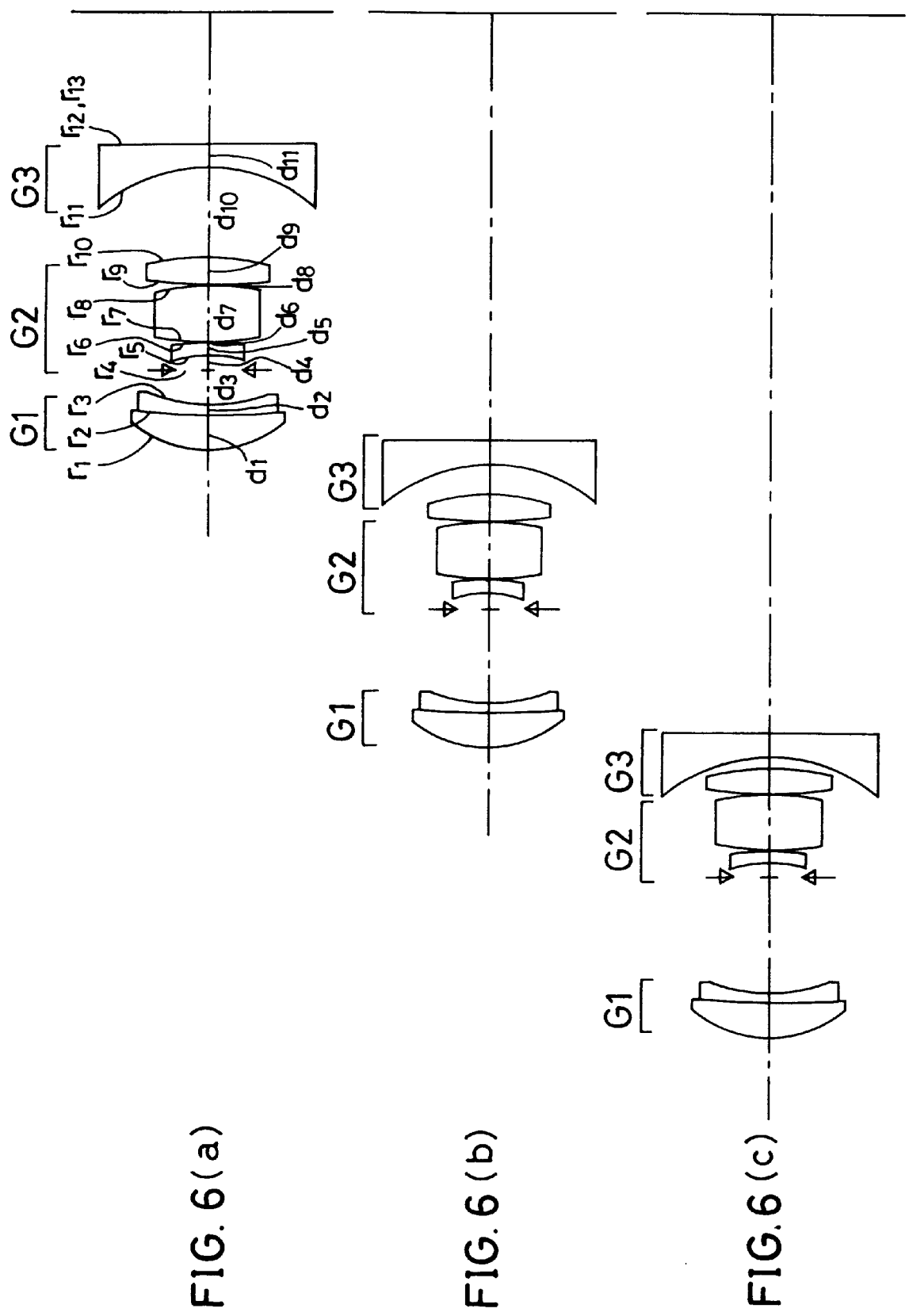

21 Transparent portion
22 Opaque portion

24 Low-refractive-index portion
23 High-refractive-index portion

ZOOM LENS SYSTEM HAVING A DIFFRACTIVE SURFACE

BACKGROUND OF THE INVENTION

The present invention relates generally to an optical system comprising a diffractive surface having a lens action based on a diffraction phenomenon, and more particularly to a compact yet high-zoom-ratio zoom lens system comprising a diffractive surface, which is used with lens shutter cameras, etc.

For lens shutter cameras (hereinafter called LS cameras for short) with built-in zoom lenses, many makers have recently developed a variety of products now widely accepted to many users because of their convenience and ease of use. Thus, it appears that LS cameras have steadily spread as commodities. A variety of LS cameras having an ever higher zoom ratio are now proposed with new values added thereto. However, the body size of currently available cameras become large with increasing zoom ratios. This is not always preferable for users. To solve such size problems, on the other hand, ultra-compact cameras are put forward with much importance given to portability. However, all available cameras have both merits and demerits; compact yet high-zoom-ratio cameras are greatly needed. Thus, phototaking lens systems to meet such demands are expected.

JP-A 4-37810 discloses a three-group zoom lens system having a zoom ratio of 2.6, which comprises, in order from the object side thereof, a positive lens group, a positive lens group and a negative lens group, about 10 lenses in all. The diameter of the first lens group is reduced by locating a stop on the side of the second lens group nearest to an object, and aberrations are well corrected by the optimization of the design of the second lens group. The total length of the zoom lens system set forth therein is much shorter than ever before. However, the total length of the lens arrangement (the length from the first surface to the final surface) is still great due to many lenses.

JP-A 8-286110 discloses a three-group zoom lens system which comprises, in order from the object side thereof, a positive lens group, a positive lens group and a negative lens group, and only two lenses for each group, six lenses in all. The zoom ratio achieved is in the range of 3.0 to as high as about 3.3. However, correction of aberrations is insufficient at each lens group, and chromatic aberrations at the telephoto end in particular become too large for correction.

JP-A 5-173069 discloses a similar zoom lens system, and one example given therein is directed to a specific zoom lens system consisting of six lenses in all and having a zoom ratio as high as 3.6. The length of the lens arrangement is short due to a reduced number of lenses. However, this system is not preferable because a vitreous material showing anomalous dispersion is used for correction of aberrations, resulting in cost increases.

On the other hand, JP-A 5-188296 discloses a similar three-group zoom lens system which comprises a positive lens group, a positive lens group and a negative lens group, and achieves a zoom ratio of 2 with a lens arrangement consisting of five lenses. The length of the lens arrangement is very short with well-corrected aberrations. However, the zoom ratio is very low. These prior systems are all designed to achieve correction of aberrations by use of an aspherical glass lens, and are unavoidably expensive.

The applicant, too, has filed Japanese Patent Application No. 8-326457 to propose a three-group zoom lens system of the positive, positive and negative type, which achieves a zoom ratio of 2 with a lens arrangement consisting of five lenses. The cost of this lens system is brought down by making use of an aspherical plastic surface. Aberrations are well corrected with a reduction in the length of the lens arrangement. However, the zoom ratio is still low.

An object of the present invention is to make proper use of a diffractive surface, thereby making high the zoom ratio of a zoom lens system which is constructed of a short lens arrangement comprising a small number of lenses at low costs yet with well-corrected aberrations.

For a better understanding of the present invention, the lens action of the diffractive surface is then explained. While a conventional lens is based on the refraction of light at a medium interface, the lens action of the diffractive surface is based on the diffraction of light. Now consider the incidence of light on such a diffraction grating as shown generally in FIG. 1. Emergent light upon diffraction satisfies the following equation (a):

$$\sin\theta - \sin\theta' = m\lambda/d \quad (a)$$

where $\theta$ is the angle of incidence, $\theta'$ is the exit angle, $\lambda$ is the wavelength of light, d is the pitch of the diffraction grating, and m is the order of diffraction. Consequently, if the pitch of a ring form of diffraction grating is properly determined according to equation (a), it is then possible to converge the incident light on one point, i.e., impart lens action to the diffraction grating. Here let $r_j$ and f the radius of a j-th ring on the grating and the focal length of the diffractive surface, respectively. Then, the following equation (b) is satisfied in a region of first approximation:

$$r_j^2 = 2j\lambda f \quad (b)$$

For a diffraction grating, on the other hand, a bright-and-dark ring form of amplitude-modulated type grating, and a phase-modulated type grating with a variable refractive index or optical path length are known. In the amplitude-modulated type, for instance, the diffraction efficiency (defined by the ratio between the quantity of incident light and the quantity of the first order of diffracted light) is about 6% at most because plural orders of diffracted light are produced. In the phase-modulated type, too, the diffraction efficiency is about 34% at most. If the diffraction grating is modified such that its section is of such saw-toothed shape as depicted in FIG. 2, however, the diffraction efficiency can theoretically be increased to 100%. Even though actual losses are taken into account, a diffraction efficiency of at least 95% is then obtainable. Such a diffraction grating is called a kinoform. In this case, the height of each tooth is given by $$h = m\lambda/(n-1) \quad (c)$$

where h is the height of the tooth, and n is the index of refraction of a substrate.

As can be predicted from equation (c), a diffraction efficiency of 100% is achievable at only one wavelength. FIG. 3 illustrates a specific wavelength vs. diffraction efficiency relation at 550 nm design wavelength. As the wavelength goes away from the design wavelength, the diffraction efficiency decreases greatly. With decreasing diffraction efficiency, the rest of light exists as unnecessary light. In the case of an optical system used under white light, care should be taken of a flare problem due to such unnecessary light.

How to design the diffractive surface is now explained. The diffractive surface may be designed by some known methods. However, the present invention makes use of an ultra-high index method. According to this method, the diffractive surface is known to be equivalent to a refractive surface having an ultra-high refractive index at null thickness. At this time, the index of refraction n(λ) at any wavelength is given by $$n(\lambda)=1+\{n(\lambda_0)-1\}\lambda/\lambda_0 \qquad (d)$$

where $\lambda$ is an arbitrary wavelength, $\lambda_0$ is a reference wavelength, and $n(\lambda_0)$ is the index of refraction at wavelength $\lambda$.

The diffractive surface has two important features when used in the form of a lens. The first feature is aspheric action, as already noted. If the pitch of a diffraction grating is properly determined, it is then possible to converge light on one point. The second feature is that dispersion is very large or, in another parlance, a so-called Abbe's number is found to be −3.45 from equation (d). Chromatic aberrations several tens times as large as that of a conventional glass material are produced with a minus sign or in the opposite direction. It is also found that strong anomalous dispersion is obtained with a low partial dispersion ratio.

An example of applying such a diffractive surface to optical systems used under natural light is known from an article "Hybrid diffractive-lenses and achromats", Appl. Opt. 27, pp. 2960–2971. This prior publication shows an example of calculation in the case where, based on the principle of correction of paraxial chromatic aberration, the diffractive surface is used in combination with a single glass lens to make correction for longitudinal chromatic aberration. Specifically, the publication shows that the plane side of a plano-convex lens is constructed of a diffractive surface for the achievement of achromatization, and refers to the resulting secondary spectra. The publication also shows the results of achromatization by a diffractive surface and doublet combination.

U.S. Pat. No. 5,543,966 shows an example of achromatization by use of a singlet and diffractive surface combination. This example is applied to a so-called film camera for the purpose of making high the performance of a phototaking optical system comprising a positive meniscus lens convex on the subject side and a stop by disposing a diffractive surface on the image-side surface of the lens, thereby making correction for chromatic aberrations.

"Diffractive optics at Eastman Kodak Company", SPIE, Vol. 2689, pp. 227–254 shows applications of the diffractive surface to a variety of optical systems. In particular, this publication exemplifies an application of the diffractive surface of a phototaking zoom lens system for LS cameras, wherein a doublet in the first lens group in a three-group zoom lens system of the positive, positive and negative type is replaced by one diffractive element. For lack of design data, however, details of that application cannot be understood.

SUMMARY OF THE INVENTION

In view of such problems with the prior art, an object of the present invention is to provide a compact yet high-zoom-ratio zoom lens system used with phototaking lens systems for LS cameras, etc. A particular object of the present invention is to make improvements in a zoom lens system made up of a reduced number of lenses, thereby providing a lens system with a reduced number of lenses yet with well-corrected aberrations According to one aspect of the present invention, the aforesaid objects are achievable by the provision of a three-group zoom lens system having a diffractive surface, which comprises, in order from an object side thereof, a positive lens group, a positive lens group, and a negative lens group, said lens groups moving for zooming from a wide angle side to a telephoto side thereof, with a separation between first and second lens groups becoming wide and a separation between second and third lens groups becoming narrow, characterized in that said negative lens group has said diffractive surface therein.

According to another aspect of the present invention, there is provided a three-group zoom lens system having a diffractive surface, which comprises, in order from an object side thereof, a positive lens group, a positive lens group, and a negative lens group, said lens groups moving for zooming from a wide angle side to a telephoto side thereof, with a separation between first and second lens groups becoming wide and a separation between second and third lens groups becoming narrow, characterized in that at least one lens group has said diffractive surface therein, and satisfies the following condition (1):

$$1.8<\beta_T/\beta_W<4.0 \qquad (1)$$

where $\beta_T$ and $\beta_W$ are transverse magnifications of said lens group having said diffractive surface therein at a wide-angle end and a telephoto end of said lens system.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

BRIEF DESCRIPTION OF THE DRAWINGS

FIGS. 6(a)–6(c) are a sectional representations of the zoom lens system of Example 3 according to the invention with respect to the optical axis thereof.

DESCRIPTION OF THE PREFERRED EMBODIMENTS

Figure 1:
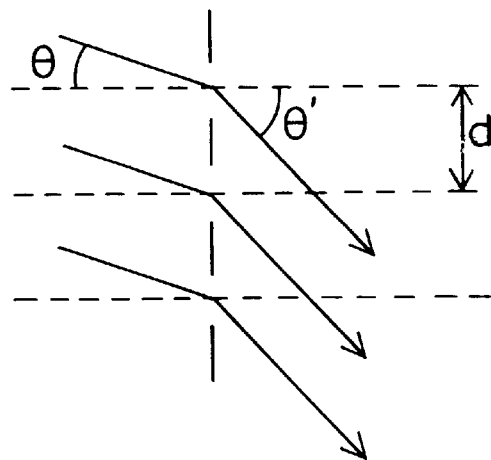
FIG. 1 is a view illustrative of the diffraction of a diffraction grating.

First, why the aforesaid arrangements are used and how they work will be described. Then, some preferred examples of the inventive lens system having a diffractive surface will be explained.

One preferable embodiment of the three-group zoom lens system of the invention comprises, in order from its object side, a positive lens group, a positive lens group, and a negative lens group. For zooming from the wide-angle side to the telephoto side of the system, the lens groups are designed in such a way that the separation between the first and second lens group becomes wide while the separation between the second and third lens groups becomes narrow. According to the invention, this zoom lens system is characterized in that the negative lens group has a diffractive surface therein.

As generally known in the art, a zoom lens system is designed in such a way that aberrations produced at the respective lens groups are well reduced. In a zoom lens system made up of a reduced number of lenses such as one disclosed in JP-A 5-188296 or Japanese Patent Application No. 8-326457, however, it is difficult to make correction for aberrations at the respective lens groups. Consequently, this type of zoom lens system is rather designed in such a way that moderate aberrations produced at the respective lens groups are offset each other. In these prior zoom lens systems, chromatic aberrations are canceled out at the second, and third lens groups. Especially when the third lens group is made up of a single lens of negative power, chromatic aberrations produced at the third lens group are canceled out by the second lens group because, in principle, the third lens group cannot make correction for chromatic aberrations. In this zoom type wherein a substantial part of zoom action is born by the third lens group, chromatic aberrations produced at the third lens group increase with increasing zoom ratio to such a degree that they cannot be corrected throughout the system. This is a principal reason the prior lens arrangements cannot have any high zoom ratio.

According to the present invention, correction of chromatic aberrations is achievable by using a diffractive surface in the third lens group responsible for chromatic aberration becoming worse. In a conventional refractive system, a positive and negative lens combination is required to satisfy achromatic conditions. In addition, it is required to use a material having a specific Abbe's number for each lens. This is also true of a diffractive surface and lens combination. However, this diffractive surface and lens combination is largely different from the positive and negative lens combination because of the unique nature of a diffractive surface. This will be briefly explained below.

In general, achromatic conditions for a doublet are defined as follows. Here, let $f_1$ and $v_1$ denote the focal length and Abbe's number of a first lens, and $f_2$ and $v_2$ stand for the focal length and Abbe's number of a second lens. Then, a condition for finding the composite focal length f of a thin contact system, and a condition for making correction for paraxial chromatic aberration are given by $$1/f = (1/f_1) + (1/f_2) \tag{e}$$

$$1/(f_1 \cdot v_1) + 1/(f_2 \cdot v_2) = 0 \tag{f}$$

From both conditions, the focal length of each lens is given by $$f_1 = (1 - v_2/v_1) \cdot f \tag{g}$$

$$f_2 = (1 - v_1/v_2) \cdot f \tag{h}$$

For instance, when a diffractive surface is formed on an acrylic resin substrate, the power distribution is 94.4% for the substrate and 5.6% for the diffractive surface; the power of the diffractive surface becomes extremely weak. The reason is that the diffractive surface has a unique Abbe's number of −3.45. Referring on the other hand to the application to a conventional refractive system of an achromatic example using an acrylic and polycarbonate resin combination, by calculation, the power of the acrylic resin lens is found to be 2.1 times as large as that of the system whereas the power of the polycarbonate resin lens is found to be −1.1 times as large as that of the system. In other words, both the positive and negative lenses are required to have strong power, resulting in a thickness increase of each lens. However, the use of the diffractive surface makes it unnecessary to increase lens power and, hence, to increase lens thickness. In addition, it is unnecessary to increase the number of parts involved because the diffractive surface can be formed on the surface of a lens. By use of the diffractive surface, it is thus possible to limit the quantity of chromatic aberrations produced without increasing the number, and thickness of lenses.

A problem to be solved by the invention is that chromatic aberrations at the telephoto end of the system become large with increasing zoom ratios. This problem can be solved by designing the system in such a manner that chromatic aberrations at the telephoto end of the system are corrected as much as possible, thereby reducing chromatic aberration variations from the wide-angle end to the telephoto end of the system. To this end, it is preferable that at least one lens group using a diffractive surface satisfies the following condition (1):

$$1.8 < \beta_T / \beta_W < 4.0 \tag{1}$$

Here $\beta_T$ and $\beta_W$ are the transverse magnifications of the lens group having a diffractive surface at the wide-angle and telephoto ends of the system. When the chromatic aberrations are corrected by using the diffractive surface for a lens group that does not satisfy the lower limit of 1.8 in condition (1), there is a chromatic aberration difference between the wide-angle end and the telephoto end, which places the chromatic aberrations in an ill-balanced state. To put it another way, the zoom ratio of the zoom lens system becomes low; it is impossible to achieve the object of the present invention or increase the zoom ratio of the zoom lens system. When the upper limit of 4.0 in condition (1) is exceeded, on the other hand, it is difficult to make correction for aberrations with as small a number of lenses as contemplated in the present invention; it is impossible to reduce the number of lenses used.

In one effort, the power, etc. of the diffractive surface formed in the second lens group were varied. As a result, it was found that aberrations throughout the system are not well balanced due to variations in chromatic aberrations at the telephoto end as well as variations in chromatic aberrations at the wide-angle end. When the diffractive surface was formed in the first lens group, too, chromatic aberrations inclusive of chromatic aberration of magnification were not well corrected. Especially in a system design wherein the diffractive surface was formed in the first lens group made up of a single lens as in the aforesaid prior art, the chromatic aberration of magnification could not be corrected at all; good-enough performance could not be obtained at such zoom ratio as contemplated in the invention.

As can be seen from the foregoing, it is desired that the diffractive surface be used in the third lens group.

The state of periphery aberrations is more complicated than the state of paraxial longitudinal chromatic aberration as mentioned above. Upon correction of longitudinal chromatic aberration at the telephoto end by varying the power of the diffractive surface formed in the third lens group, chromatic aberration of magnification varies, too. At this time, the chromatic aberration of magnification varies similarly between the wide-angle end and the telephoto end unlike the longitudinal chromatic aberration. To make good correction for the chromatic aberrations including the chromatic aberration of magnification, it is preferable to balance them against chromatic aberrations at the first lens group. At this time, it is preferable that the first lens group comprises at least two lenses and satisfies the following condition (2):

$$15 < \nu_1 - \nu_2 < 25 \tag{2}$$

Here $\nu_1$ and $\nu_2$ are Abbe's numbers of lenses forming the first lens group. With the upper limit of 25 in condition (2) exceeded, the state of achromatism at the first lens group is too good, and with the lower limit of 15 in condition (2) not reached, the quantity of chromatic aberrations produced at the first lens group is too much. In either case, the first lens group is not balanced against the third lens group.

Thus, longitudinal chromatic aberration and chromatic aberration of magnification are well corrected at the diffractive surface in the third lens group. At this time, however, it is desired that the following condition (3) be satisfied so as to prevent the diffractive surface from producing too much chromatic aberrations.

$$-0.01 < \Phi_{DOE} < 0 \tag{3}$$

Here $\Phi_{DOE}$ is the power of the diffractive surface, which includes aspherical action at any radius. This is defined by the following equation (i):

$$\Phi_{DOE} = (n-1)\{(1/r_p) - (1/r_a)\} \tag{i}$$

Here $\Phi_{DOE}$ is power, $r_p$ is the approximate radius of curvature of an object-side surface of a lens having a diffractive surface, and $r_a$ is the approximate radius of curvature of an image-side surface of a lens having a diffractive surface. In an actual case where the diffractive surface is formed on the object-side surface of the substrate, $r_p$ represents the approximate radius of curvature of the diffractive surface and $r_a$ represents the approximate radius of curvature of the substrate. In equation (i), n is the index of refraction. With the upper limit of 0 in condition (3) exceeded, the power of the diffractive surface becomes insufficient, resulting in insufficient correction of chromatic aberrations and, hence, leaving chromatic aberrations over-corrected. When the lower limit of −0.01 in condition (3) is not reached, on the other hand, the negative power of the diffractive surface becomes strong, and chromatic aberrations are accordingly rather left under-corrected. Not only in the diffractive surface but also in an aspherical surface, the power varies between the center of the lens and the periphery of the lens. However, the diffractive surface, because of having dispersion several tens times as high as that of an ordinary refractive surface, produces a largely varying amount of chromatic aberrations even when there is a slight power difference throughout the surface. In the third lens group of the zoom type according to the present invention, an optical path for axial rays is quite different from an optical path for off-axis rays. Consequently, even when the power of the diffractive surface becomes weak in the vicinity of the optical axis, that power becomes often too strong for correction of curvature of field and distortion, because the diffractive surface has an aspherical effect at an off-axis position. In this case, chromatic aberration of magnification produced becomes too large to achieve good-enough performance. It is thus preferred that the overall diffractive surface satisfies condition (3).

To make better correction for chromatic aberrations, condition (3) is preferably reduced to the following range:

$$-0.005 < \Phi_{DOE} < 0 \tag{4}$$

By placing some limitation on the lower limit value of $\Phi_{DOE}$, it is possible to make the power of the diffractive surface weak, so that the quantity of secondary spectra produced or higher-order aberrations produced can be reduced.

There are some approaches to imparting no strong power to the diffractive surface. First, the diffractive surface is formed on an aspherical form of substrate. Monochromatic aberrations are corrected at the aspherical surface of the substrate while the diffractive surface contributes only to correction of chromatic aberrations. Second, the diffractive surface is separated from an aspherical surface. At this time, it is preferable that both surfaces are as close to each other as possible. For instance, one side of a lens is formed into a diffractive surface and another side of the lens is formed into an aspherical surface. The monochromatic aberrations can be corrected at the aspherical surface while the chromatic aberrations can be corrected at the diffractive surface.

So far, how to obtain a zoom lens system having a high zoom ratio yet with well-corrected aberrations has been explained. To achieve further size reductions, it is preferable that the zoom lens system of the invention satisfies the following condition (5):

$$0.4 < \Sigma d/D < 1.0 \tag{5}$$

Here $\Sigma d$ is the length from the first surface to the final surface, and D is the diagonal length of the surface of film. Condition (5) is provided to make a camera thin. In most cases, the thickness of a camera body is determined by a lens barrel. Thus, how the lens barrel is made thin becomes an important problem. Since a conventional barrel has a structure where lens groups move in a given barrel, the length from the first surface to the film surface is important. In recent years, however, a thinness-conscious camera is achieved by a technique enabling a lens barrel to be housed in a camera body. In this case, the length of the first surface to the final surface is important. With the upper limit of 1.0 in condition (5) exceeded, therefore, it is difficult to achieve compactness. With the lower limit of 0.4 not reached, on the other hand, good-enough correction of aberrations cannot be achieved.

Condition (5) is more preferably reduced to the following range:

$$0.4 < \Sigma d/D < 0.8 \tag{6}$$

By conforming to condition (6), it is possible to achieve much more compactness.

It is desired that the third lens group be made up of a single negative lens. The third lens group comes close to the film surface at the wide-angle end, and so the contour thereof is large. An increase in the number of lenses forming the third lens group has a large adverse influence on the cost and length of the lens system. It is also preferable to construct the negative lens of plastics, because cost reductions are achievable.

The gravest problem with a diffractive system is a flare due to unnecessary light, and is unavoidable in the case of optical equipment used in a wide wavelength range, for instance, a camera. To avert such a flare problem, it is desired to use such a diffractive surface as put forward by the applicant in JP-A 9-127321. The diffractive surface disclosed therein comprises a multilayer structure of optical materials with a relief pattern formed on the interface between them, thereby eliminating the flare problem. To this end, it is desired that the diffractive surface-forming substrate satisfy the following conditions (7):

$$n_d > 1.65, \nu_d > 50 \quad (7)$$

Here $n_d$ is the d-line refractive index of the substrate, and $\nu_d$ is the d-line Abbe's number of the substrate. It is to be noted that the upper limits in conditions (7) are by themselves determined by an available material.

The lens system comprising a diffractive surface according to the present invention will be described with reference to Examples 1 to 4.

A diffractive surface in the optical system according to the present invention is designed using the ultra-high index method, and specifically expressed by a refractive index of 1001 at null thickness and d-line wavelength. The index of refraction at other line-wavelengths is calculated from equation (d). In numerical data given later, too, an ordinary aspherical equation such as one shown below is used. Here let a Z-axis and a Y-axis be an optical axis direction and a direction perpendicular to the optical axis, respectively. Then, the aspherical surface is given by $$Z = CY^2/[1+\sqrt{1-(1+K)C^2Y^2}] + A_4Y^4 + A_6Y^6 + A_8Y^8 + A_{10}Y^{10} \quad (g)$$

where C is curvature at a surface apex (=1/r where r is the radius of curvature), K is a conical coefficient, and $A_4$, $A_6$, $A_8$, $A_{10}$ are fourth, sixth, eighth, and tenth-order aspherical coefficients, respectively.

The surface coming in contact with the diffractive surface at null thickness is a surface of the substrate material. In actual production, the diffractive surface is formed on the surface of the substrate material using a phase change found from a difference between the aspherical shape of the diffractive surface and the surface shape of the material and the indices of refraction. In other words, it is the surface of the substrate material which has final lens action in each of the examples given later. In this regard, it is to be noted that an aspherical surface defined by an ultra-high index refractive lens and here called the diffractive surface does not actually exist. In the lens section corresponding to each example, however, surface Nos. denoting the diffractive surfaces in the numerical data are shown in the form of $r_9$, $r_{11}$, etc.

Figure 2:
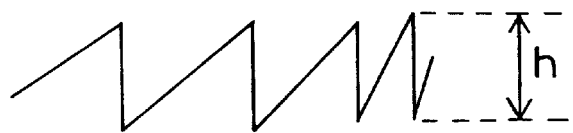
FIG. 2 is a view illustrative of one sectional shape of a kinoform.
Figure 3:
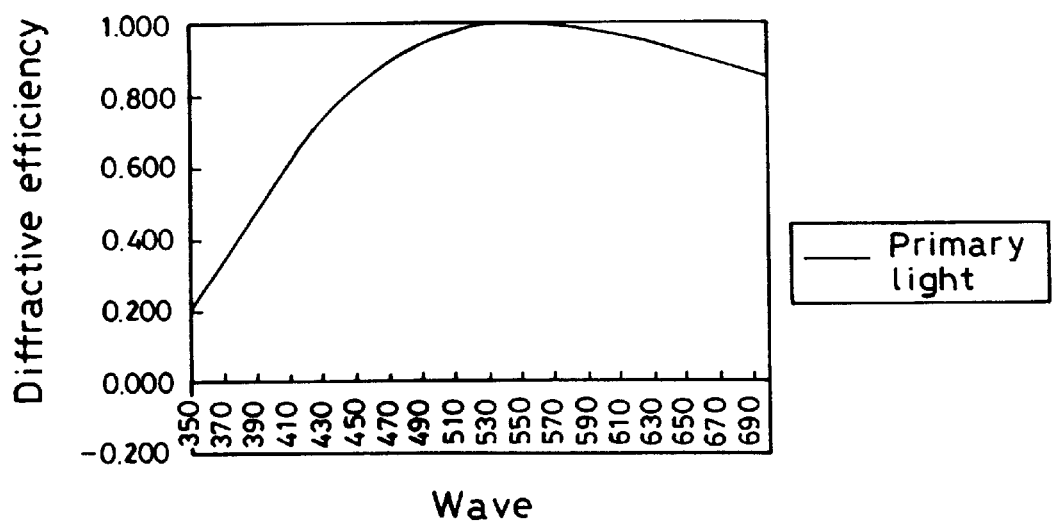
FIG. 3 is a graph illustrative a specific wavelength vs. diffraction efficiency relation at a design wavelength of 550 nm.
Figures 4A, 4B, 4C:
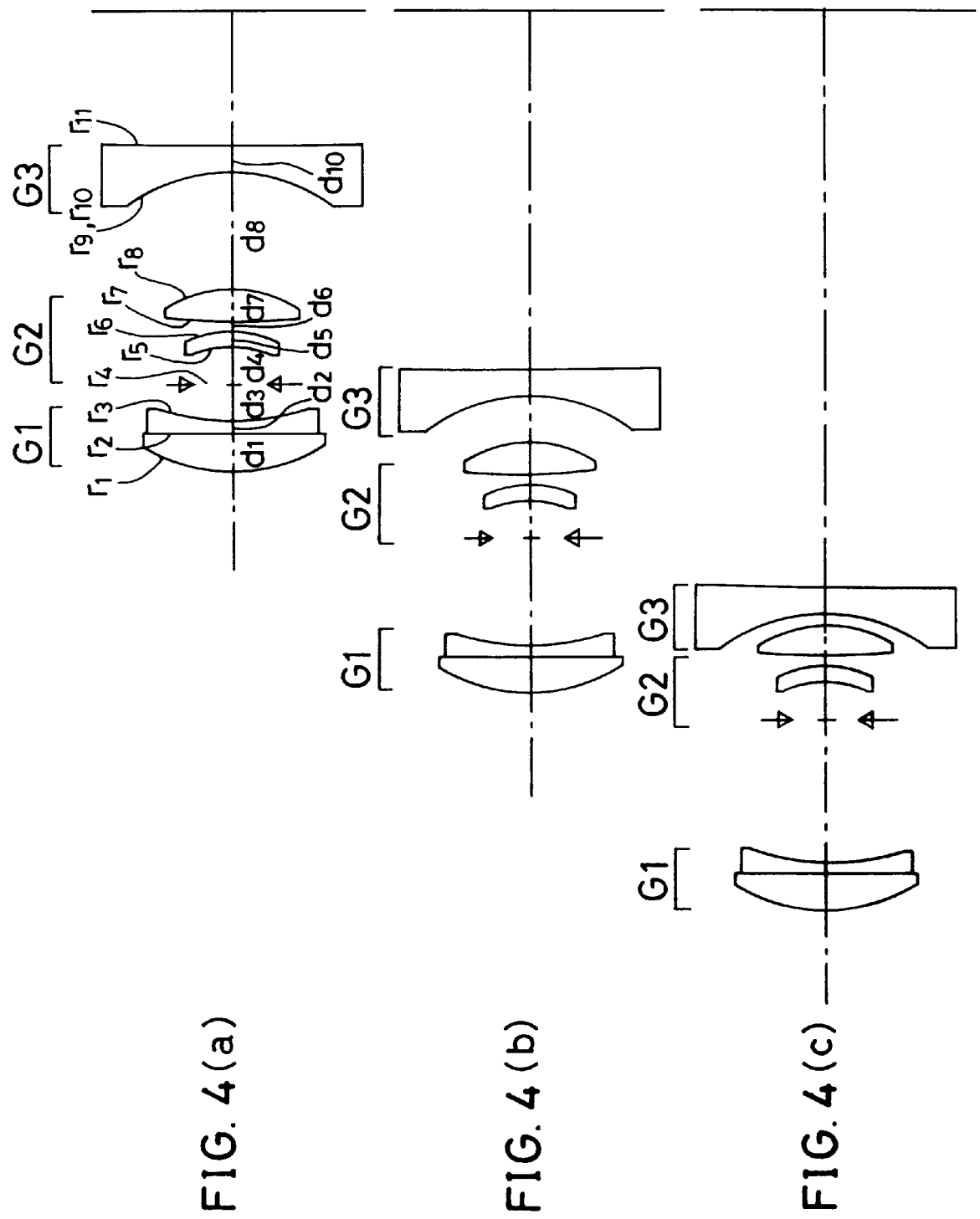
FIGS. 4(a)–4(c) are a sectional representations of the zoom lens system of Example 1 according to the invention with respect to the optical axis thereof.
Figures 5A, 5B, 5C:
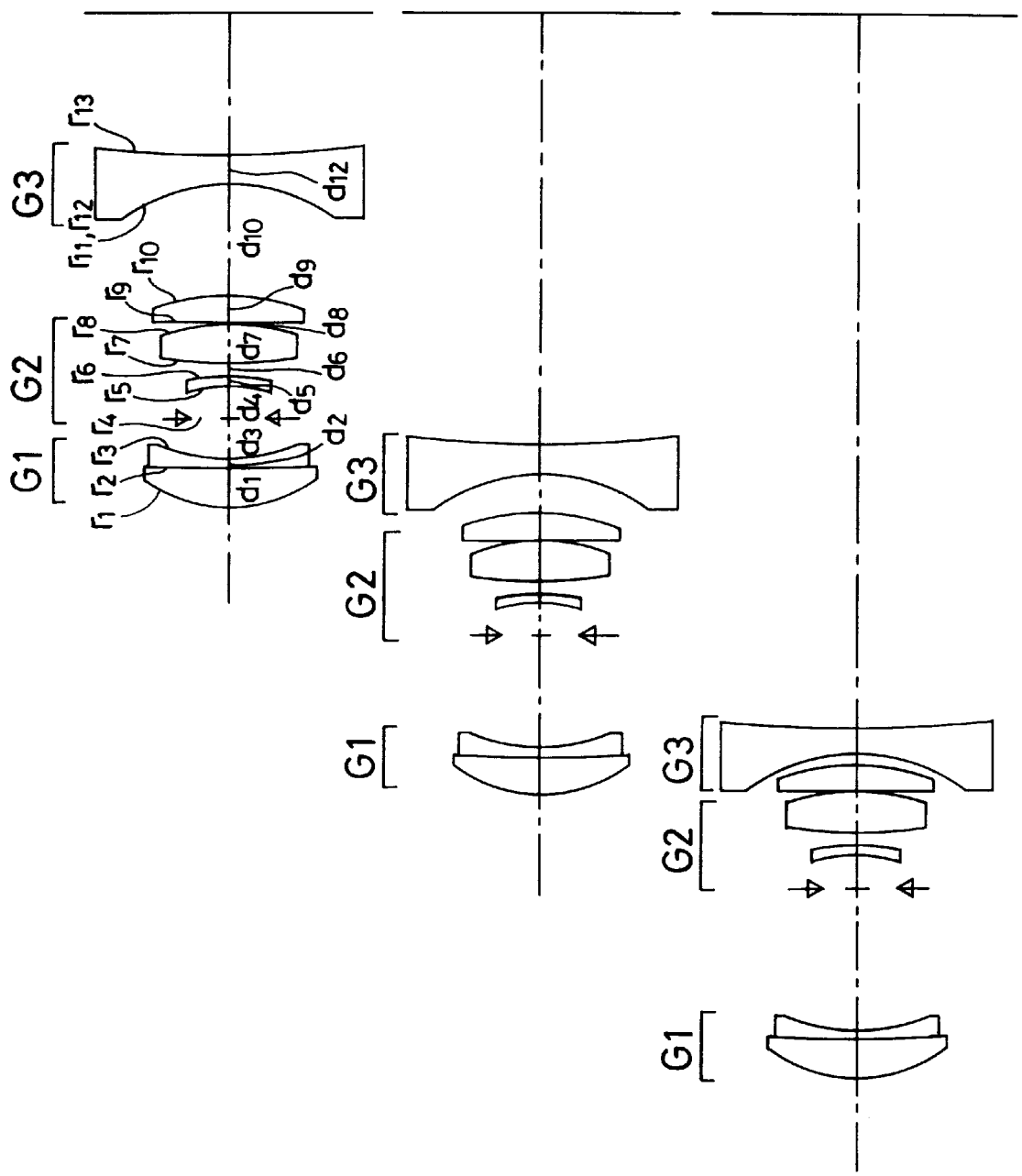
FIGS. 5(a)–5(c) are a sectional representations of the zoom lens system of Example 2 according to the invention with respect to the optical axis thereof.
Figures 7A, 7B, 7C:
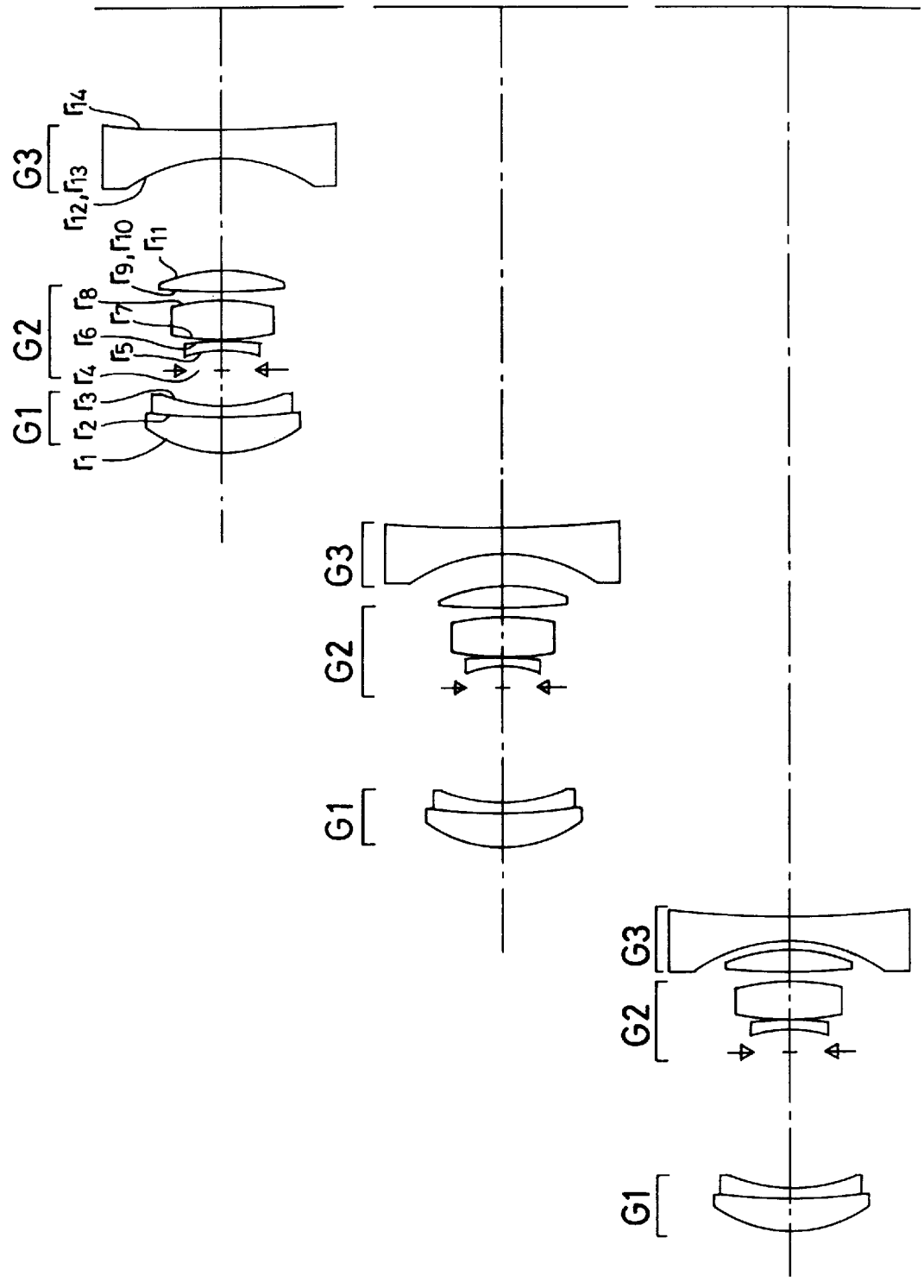
FIGS. 7(a)–7(c) are is a sectional representations of the zoom lens system of Example 4 according to the invention with respect to the optical axis thereof.

Some exemplary sectional shapes of the diffractive surface are shown in FIG. 9. Shown in FIG. 9(a) is a diffractive surface called an amplitude-modulated type wherein an alternate arrangement of transparent and opaque portions 21 and 22 is provided, with the thickness of each opaque portion 22 being substantially zero. Shown in FIG. 9(b) is an alternate arrangement of high- and low-refractive index portions 23 and 24, to which diffraction is imparted through a phase difference due to a refractive index difference. Shown in FIG. 9(c) is an alternate arrangement of rectangular asperities, to which diffraction is imparted through a phase difference due to a thickness difference. This arrangement is also called a 2-level binary element. Shown in FIG. 9(d) is a kinoform arrangement having a saw-toothed surface, to which diffraction is imparted by a phase difference due to a continuous thickness difference (see FIG. 2). FIG. 9(e) and 9(f) are illustrative of binary elements to 4-, and 8-level approximation (see FIG. 3). Thus, some diffractive surface shapes are available. In the practice of the present invention, however, it is preferable to use the kinoform of FIG. 9(d), and the 4-, or more level binary elements of FIG. 9(e) and 9(f) so that the diffraction efficiency can be increased to make full use of the quantity of light.

FIGS. 4 to 7 are sectional views of the lens systems of Examples 1 to 4 with respect to the optical axes at the wide-angle ends (a), intermediate settings (b) and telephoto ends (c). These examples are each directed to a three-group zoom lens system comprising, in order from the object side thereof, a first positive lens group G1, a second positive lens group G2, and a third negative lens group G3.

Example 1 is directed to a zoom lens system having a zoom ratio of 2.4. As can be seen from FIG. 4, the first lens group G1 consists of a doublet composed of a positive meniscus lens convex on the object side and a negative meniscus lens convex on the object side, the second lens group G2 consists of a stop, a negative meniscus lens convex on the image side and a double-convex positive lens, and the third lens group G3 consists of a double-concave negative lens. Thus, this zoom lens system is made up of five lenses in all. The fourth, and fifth lenses as counted from the object side are aspherical plastic lenses, with the object-side surface of the fifth lens being formed as a diffractive surface. The surface of the substrate has an aspherical form, on which the diffractive surface is provided, thereby elaborately allocating correction of monochromatic aberrations to the aspherical surface and correction of chromatic aberrations to the diffractive surface. Consequently, the overall diffractive surface can be constructed with weak power. By use of plastic lenses, cost reductions are achieved, and by using plastic material for the positive lens, and negative lens, it is possible to reduce a focus shift incidental to environmental changes such as temperature, and humidity changes. Further, it is preferable to use plastic material of low hygroscopicity because the influence of humidity changes varies capriciously with time, and so is difficult to control. The plastic lenses used in the instant example, too, are formed of plastic material having low hygroscopicity.

Example 2 is directed to a zoom lens system having a zoom ratio of about 2.8. As can be seen from FIG. 5, the first lens group G1 consists of a doublet composed of a positive meniscus lens convex on the object side and a negative meniscus lens convex on the object side, the second lens group G2 consists of a stop, a negative meniscus lens convex on the image side, a double-convex positive lens and a positive meniscus lens convex on the image side, and the third lens group G3 consists of a double-concave lens. Thus, this lens system is made up of six lenses in all. The fifth, and sixth lenses as counted from the object side are aspherical plastic lenses, and the object-side surface of the sixth lens is in an aspherical shape, and formed as a diffractive surface. This zoom lens system has a zoom ratio higher than that of Example 1 because the second lens group G2 is composed of three lenses. While the high zoom ratio is achieved, curvature of field becomes large at the telephoto end. To make correction for this, it is desired to use an aspherical surface in the first group G1. In the instant embodiment, the second lens has an aspherical surface on the image side.

Example 3 is directed to a zoom lens system having a zoom ratio of about 3.2. As can be seen from FIG. 6, the first lens group G1 consists of a doublet composed of a positive meniscus lens convex on the object side and a negative meniscus lens convex on the object side, the second lens group G2 consists of a stop, a negative meniscus lens convex on the image side, a double-convex positive lens and a double-convex positive lens, and the third lens group G3 consists of a plano-concave negative lens. Thus, this lens system is made up of six lenses in all. The fifth lens as counted from the object side is an aspherical plastic lens, and the sixth lens is constructed of a glass lens. The sixth lens has an aspherical surface on the object side and a diffractive surface on the image side. The substrate has a flat surface, on which the diffractive surface is formed, thereby achieving ease of processing, and manufacture. The substrate is formed of glass partly for the reason of making correction for aberrations. However, the principal reason is to achieve an arrangement for eliminating the flare problem due to unnecessary light as proposed by the application in JP-A 9-127321. In this example, the aspherical surface is separated from the diffractive surface so as to prevent strong power from being imparted to the diffractive surface. In this example, it is to be noted that the first lens has an aspherical surface on the object side.

Example 4 is directed to a zoom lens system having a zoom ratio of about 3.7. As can be seen from FIG. 7, the first lens group G1 consists of a doublet composed of a positive meniscus lens convex on the object side and a negative meniscus lens convex on the object side, the second lens group G2 consists of a stop, a negative meniscus lens convex on the image side, a double-convex positive lens and a double-convex positive lens, and the third lens group G3 consists of a double-concave negative lens. Thus, this lens system is made up of six lenses in all. The fifth, and sixth lenses as counted from the object side are aspherical plastic lenses. In the instant example, not only the sixth lens but also the fifth lens have a diffractive surface. The fifth lens has a diffractive surface on the object side and an aspherical surface on the image side. The sixth lens is similar to that in Example 2. As the zoom ratio exceeds 3.5, longitudinal chromatic aberration variations incidental to zooming becomes larger and larger. Such large longitudinal chromatic aberration cannot perfectly be corrected by only the diffractive surface in the third lens group G3. If an additional diffractive surface is used in the second lens group G2, it is then possible to keep performance in a good condition. In this case, the diffractive surface may be incorporated somewhere in the second lens group G2. However, it is preferable to form the diffractive surface on the plastic lens by reason of ease of manufacture. In this example, it is to be noted that the first lens has an aspherical surface on the object side.

The zoom lens system according to each example is designed such that for zooming, the first and third lens groups G1 and G2 move substantially in unison. Throughout the zooming space, therefore, the length ($\Sigma d$) of the lens arrangement remains invariable. This lens arrangement enables the structure of the lens barrel to be simplified, and so makes it possible to improve precision and reduce the number of parts involved. It is to be understood that the degree of freedom in design can be easily increased by making the respective lens groups movable independently.

Set out below are numerical data on Examples 1 to 4. In these data, f is a focal length, $F_{NO}$ is an F-number, $2\omega$ is a field angle, $f_B$ is a back focus, $\Sigma d$ is a length from the first surface to the final surface, $\beta_3$ is a transverse magnification of the third lens group, $r_1, r_2, \ldots$ are radii of curvature of lens surfaces, $d_1, d_2, \ldots$ are separations between adjacent lens surfaces, $n_{d1}, n_{d2}, \ldots$ are d-line indices of refraction of lenses, $\nu_{d1}, \nu_{d2}, \ldots$ are d-line Abbe's numbers of lenses.

The aspherical shape is represented by equation (j) already mentioned. "Diff.sf" is an abbreviation of diffractive surface

EXAMPLE 1 f = 36.20~61.47~86.77
$F_{NO}$ = 4.67~6.90~9.01
$2\omega$ = 60.17~38.26~27.70°
$f_B$ = 11.80~31.30~50.27
$\Sigma d$ = 28.34~28.35~28.33
$\beta_3$ = 1.56~2.39~3.21

| | | | |
|---|---|---|---|
| $r_1$ = 14.03500 | $d_1$ = 3.300 | $n_{d1}$ = 1.72916 | $\nu_{d1}$ = 54.68 |
| $r_2$ = 162.42500 | $d_2$ = 1.000 | $n_{d2}$ = 1.83400 | $\nu_{d2}$ = 37.16 |
| $r_3$ = 20.08000 | $d_3$ = (Variable) | | |
| $r_4 = \infty$ (Stop) | $d_4$ = 3.400 | | |
| $r_5$ = −8.11400 | $d_5$ = 1.200 | $n_{d3}$ = 1.80518 | $\nu_{d3}$ = 25.42 |
| $r_6$ = −11.38900 | $d_6$ = 1.100 | | |
| $r_7$ = 94.10500 | $d_7$ = 2.900 | $n_{d4}$ = 1.52542 | $\nu_{d4}$ = 55.78 |
| $r_8$ = −10.22900 (Aspheric) | $d_8$ = (Variable) | | |
| $r_9$ = −13.48347 (Diff. sf) | $d_9$ = 0.000 | $n_{d5}$ = 1001 | $\nu_{d5}$ = −3.45 |
| $r_{10}$ = −13.48376 (Aspheric) | $d_{10}$ = 1.900 | $n_{d6}$ = 1.52542 | $\nu_{d6}$ = 55.78 |
| $r_{11}$ = 232.59600 | | | |

Zooming Spaces

| f | 36.20 | 61.47 | 86.77 |
|---|---|---|---|
| $d_3$ | 3.300 | 9.527 | 12.532 |
| $d_8$ | 10.242 | 4.025 | 1.000 |

Aspherical Coefficients

8th surface
K = 0
$A_4 = 1.45110 \times 10^{-4}$
$A_6 = -1.64610 \times 10^{-7}$
$A_8 = 3.15250 \times 10^{-8}$
$A_{10} = -4.08980 \times 10^{-10}$ 9th surface
K = 0
$A_4 = 7.20520 \times 10^{-5}$
$A_6 = 6.34542 \times 10^{-7}$
$A_8 = -7.97213 \times 10^{-9}$
$A_{10} = 3.71374 \times 10^{-11}$ 10th surface
K = 0
$A_4 = 7.20403 \times 10^{-5}$
$A_6 = 6.34744 \times 10^{-7}$
$A_8 = -7.97520 \times 10^{-9}$
$A_{10} = 3.71502 \times 10^{-11}$

EXAMPLE 2 f = 36.23~68.93~101.66
$F_{NO}$ = 4.67~7.76~10.75
$2\omega$ = 60.13~34.67~23.93°
$f_B$ = 11.81~35.82~59.39
$\Sigma d$ = 28.89~28.90~28.88
$\beta_3$ = 1.63~2.82~3.98

| | | | |
|---|---|---|---|
| $r_1$ = 12.91400 | $d_1$ = 3.300 | $n_{d1}$ = 1.72916 | $\nu_{d1}$ = 54.68 |
| $r_2$ = 80.87400 | $d_2$ = 0.800 | $n_{d2}$ = 1.83400 | $\nu_{d2}$ = 37.16 |
| $r_3$ = 17.63700 (Aspheric) | $d_3$ = (Variable) | | |
| $r_4 = \infty$ (Stop) | $d_4$ = 2.700 | | |
| $r_5$ = −10.84200 | $d_5$ = 0.800 | $n_{d3}$ = 1.83400 | $\nu_{d3}$ = 37.16 |
| $r_6$ = −23.18400 | $d_6$ = 1.000 | | |
| $r_7$ = 40.99300 | $d_7$ = 3.500 | $n_{d4}$ = 1.56384 | $\nu_{d4}$ = 60.67 |
| $r_8$ = −19.33500 | $d_8$ = 0.100 | | |
| $r_9$ = −159.94100 | $d_9$ = 2.200 | $n_{d5}$ = 1.52542 | $\Xi_{d5}$ = 55.78 |
| $r_{10}$ = −15.09000 (Aspheric) | $d_{10}$ = (Variable) | | |
| $r_{11}$ = −12.82086 (Diff. sf) | $d_{11}$ = 0.000 | $n_{d6}$ = 1001 | $\nu_{d6}$ = −3.45 |
| $r_{12}$ = −12.82117 (Aspheric) | $d_{12}$ = 1.900 | $n_{d7}$ = 1.52542 | $\nu_{d7}$ = 55.78 |
| $r_{13}$ = 87.39000 | | | |

Zooming Spaces

| f | 36.23 | 68.93 | 101.66 |
|---|---|---|---|
| $d_3$ | 3.300 | 9.390 | 11.883 |
| $d_{10}$ | 9.593 | 3.513 | 1.000 |

-continued

Aspherical Coefficients

| | | |
|---|---|---|
| 3rd surface | K = 0 | |
| | $A_4 = 2.23600 \times 10^{-6}$ | |
| | $A_6 = 5.51250 \times 10^{-8}$ | |
| | $A_8 = -1.55000 \times 10^{-9}$ | |
| | $A_{10} = 0$ | |
| 10th surface | K = 0 | |
| | $A_4 = 1.24090 \times 10^{-4}$ | |
| | $A_6 = 1.24330 \times 10^{-7}$ | |
| | $A_8 = 5.51340 \times 10^{-11}$ | |
| | $A_{10} = -2.62740 \times 10^{-11}$ | |
| 11th surface | K = 0 | |
| | $A_4 = 8.00820 \times 10^{-5}$ | |
| | $A_6 = 8.48914 \times 10^{-7}$ | |
| | $A_8 = -1.09458 \times 10^{-8}$ | |
| | $A_{10} = 5.02720 \times 10^{-11}$ | |
| 12th surface | K = 0 | |
| | $A_4 = 8.00637 \times 10^{-5}$ | |
| | $A_6 = 8.49194 \times 10^{-7}$ | |
| | $A_8 = -1.09494 \times 10^{-8}$ | |
| | $A_{10} = 5.02860 \times 10^{-11}$ | |

EXAMPLE 3 f = 36.20~76.01~115.85
$F_{NO}$ = 4.67~8.52~12.26
2ω = 60.15~31.61~21.08°
$f_B$ = 11.80~38.80~65.41
Σd = 28.02~28.03~28.01
$β_3$ = 1.75~3.33~4.89

| | | | |
|---|---|---|---|
| $r_1$ = 11.94800 (Aspheric) | $d_1$ = 3.000 | $n_{d1}$ = 1.72916 | $v_{d1}$ = 54.68 |
| $r_2$ = 64.53700 | $d_2$ = 1.000 | $n_{d2}$ = 1.83400 | $v_{d2}$ = 37.16 |
| $r_3$ = 16.10600 | $d_3$ = (Variable) | | |
| $r_4$ = ∞ (Stop) | $d_4$ = 1.300 | | |
| $r_5$ = -12.47300 | $d_5$ = 1.000 | $n_{d3}$ = 1.83400 | $v_{d3}$ = 37.16 |
| $r_6$ = -44.32700 | $d_6$ = 0.100 | | |
| $r_7$ = 28.53400 | $d_7$ = 5.200 | $n_{d4}$ = 1.56883 | $v_{d4}$ = 56.36 |
| $r_8$ = -26.14000 | $d_8$ = 0.100 | | |
| $r_9$ = 47.27400 | $d_9$ = 2.700 | $n_{d5}$ = 1.52542 | $v_{d5}$ = 55.78 |
| $r_{10}$ = -16.07500 (Aspheric) | $d_{10}$ = (Variable) | | |
| $r_{11}$ = -12.36700 (Aspheric) | $d_{11}$ = 1.900 | $n_{d6}$ = 1.69680 | $v_{d6}$ = 55.53 |
| $r_{12}$ = ∞ | $d_{12}$ = 0.000 | $n_{d7}$ = 1001 | $v_{d7}$ = -3.45 |
| $r_{13}$ = 497582.00000 (Diff. sf.) | | | |

Zooming Spaces

| | | | |
|---|---|---|---|
| f | 36.20 | 76.01 | 115.85 |
| $d_3$ | 3.300 | 8.758 | 10.713 |
| $d_{10}$ | 8.423 | 2.974 | 1.000 |

Aspherical Coefficients

| | |
|---|---|
| 1st surface | K = 0 |
| | $A_4 = -1.14930 \times 10^{-6}$ |
| | $A_6 = -7.10090 \times 10^{-8}$ |
| | $A_8 = 1.23950 \times 10^{-9}$ |
| | $A_{10} = 0$ |
| 10th surface | K = 0 |
| | $A_4 = 1.64480 \times 10^{-4}$ |
| | $A_6 = -9.60080 \times 10^{-7}$ |
| | $A_8 = 3.51760 \times 10^{-8}$ |
| | $A_{10} = -4.41550 \times 10^{-10}$ |
| 11th surface | K = 0 |
| | $A_4 = 1.04170 \times 10^{-4}$ |
| | $A_6 = -1.76400 \times 10^{-7}$ |
| | $A_8 = 4.94750 \times 10^{-9}$ |
| | $A_{10} = -2.91680 \times 10^{-11}$ |
| 13th surface | K = 0 |
| | $A_4 = -7.97466 \times 10^{-9}$ |
| | $A_6 = 3.97516 \times 10^{-11}$ |

-continued

| | |
|---|---|
| | $A_8 = 8.11477 \times 10^{-14}$ |
| | $A_{10} = -1.07797 \times 10^{-15}$ |

EXAMPLE 4 f = 36.21~85.74~135.24
$F_{NO}$ = 4.67~9.50~14.18
2ω = 60.30~28.23~18.13°
$f_B$ = 11.80~48.49~84.61
Σd = 29.15~29.16~29.14
$β_3$ = 1.65~3.48~5.29

| | | | |
|---|---|---|---|
| $r_1$ = 12.79300 (Aspheric) | $d_1$ = 3.000 | $n_{d1}$ = 1.72916 | $v_{d1}$ = 54.68 |
| $r_2$ = 57.68300 | $d_2$ = 1.000 | $n_{d2}$ = 1.83400 | $v_{d2}$ = 37.16 |
| $r_3$ = 16.55900 | $d_3$ = (Variable) | | |
| $r_4$ = ∞ (Stop) | $d_4$ = 2.000 | | |
| $r_5$ = -10.72500 | $d_5$ = 0.800 | $n_{d3}$ = 1.83481 | $v_{d3}$ = 42.72 |
| $r_6$ = -61.35200 | $d_6$ = 0.100 | | |
| $r_7$ = 32.68400 | $d_7$ = 3.800 | $n_{d4}$ = 1.57501 | $v_{d4}$ = 41.50 |
| $r_8$ = -17.63400 | $d_8$ = 0.700 | | |
| $r_9$ = 91.23163 (Diff. sf) | $d_9$ = 0.000 | $n_{d5}$ = 1001 | $v_{d5}$ = -3.45 |
| $r_{10}$ = 91.25489 | $d_{10}$ = 2.000 | $n_{d6}$ = 1.52542 | $v_{d6}$ = 55.78 |
| $r_{11}$ = -14.19900 (Aspheric) | $d_{11}$ = (Variable) | | |
| $r_{12}$ = -13.0065 (Diff. sf) | $d_{12}$ = 0.000 | $n_{d7}$ = 1001 | $v_{d7}$ = -3.45 |
| $r_{13}$ = -13.00120 (Aspheric) | $d_{13}$ = 1.900 | $n_{d8}$ = 1.52542 | $v_{d8}$ = 55.78 |
| $r_{14}$ = 86.36800 | | | |

Zooming Spaces

| | | | |
|---|---|---|---|
| f | 36.21 | 85.74 | 135.24 |
| $d_3$ | 3.300 | 10.583 | 12.836 |
| $d_{11}$ | 10.546 | 3.273 | 1.000 |

Aspherical Coefficients

| | |
|---|---|
| 1st surface | K = 0 |
| | $A_4 = -2.15190 \times 10^{-6}$ |
| | $A_6 = 4.51910 \times 10^{-9}$ |
| | $A_8 = -7.24030 \times 10^{-11}$ |
| | $A_{10} = 3.72350 \times 10^{-12}$ |
| 11th surface | K = 0 |
| | $A_4 = 1.48210 \times 10^{-4}$ |
| | $A_6 = -1.22680 \times 10^{-7}$ |
| | $A_8 = 1.95370 \times 10^{-8}$ |
| | $A_{10} = -2.03200 \times 10^{-10}$ |
| 12th surface | K = 0 |
| | $A_4 = 8.02080 \times 10^{-5}$ |
| | $A_6 = 8.49737 \times 10^{-7}$ |
| | $A_8 = -1.09356 \times 10^{-8}$ |
| | $A_{10} = 4.02850 \times 10^{-11}$ |
| 13th surface | K = 0 |
| | $A_4 = 8.01925 \times 10^{-5}$ |
| | $A_6 = 8.49961 \times 10^{-7}$ |
| | $A_8 = -1.09391 \times 10^{-8}$ |
| | $A_{10} = 5.02986 \times 10^{-11}$ |

Figure 8A:
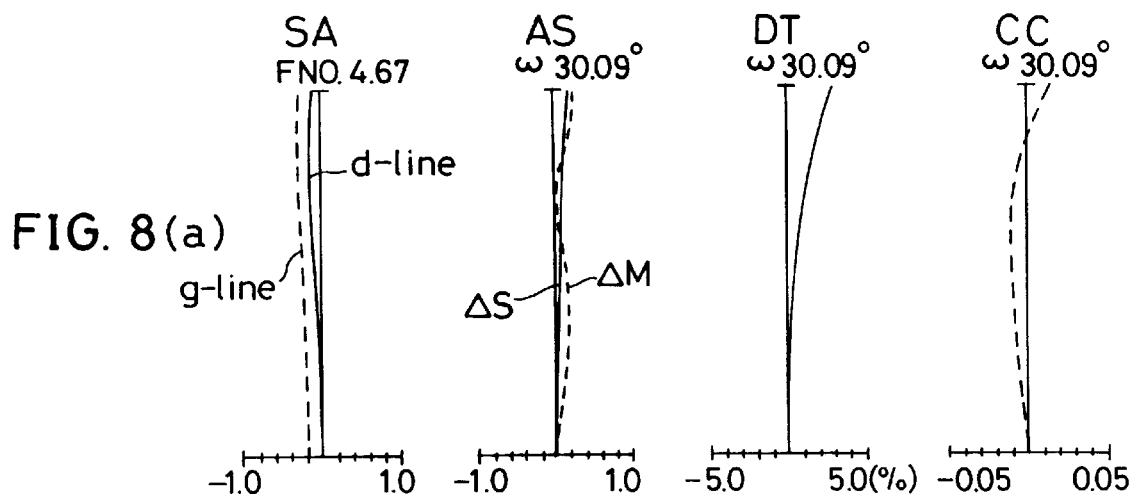
FIGS. 8(a)–8(c) are an aberration diagrams of Example 1.
Figure 8B:
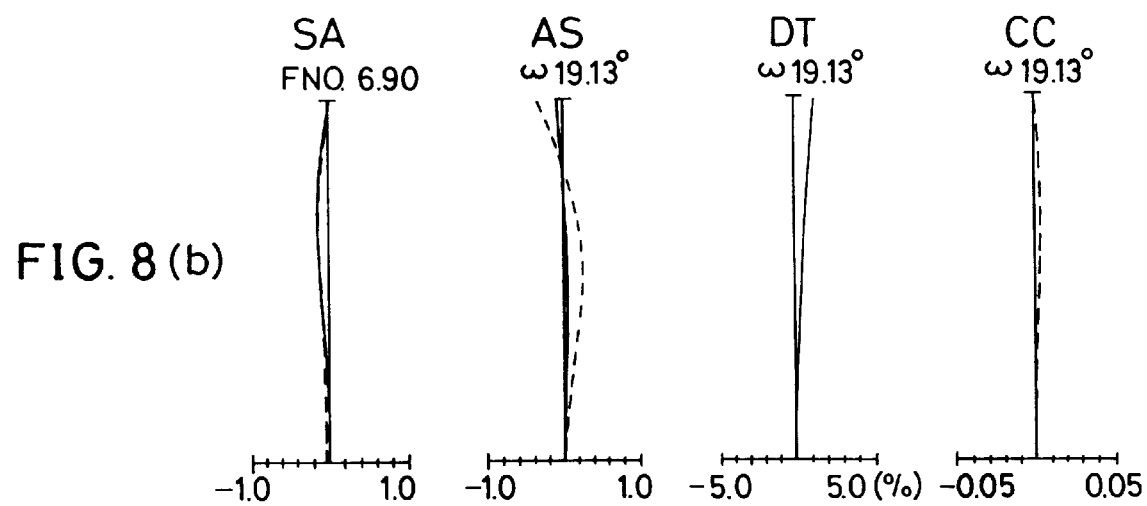
Figure 8C:
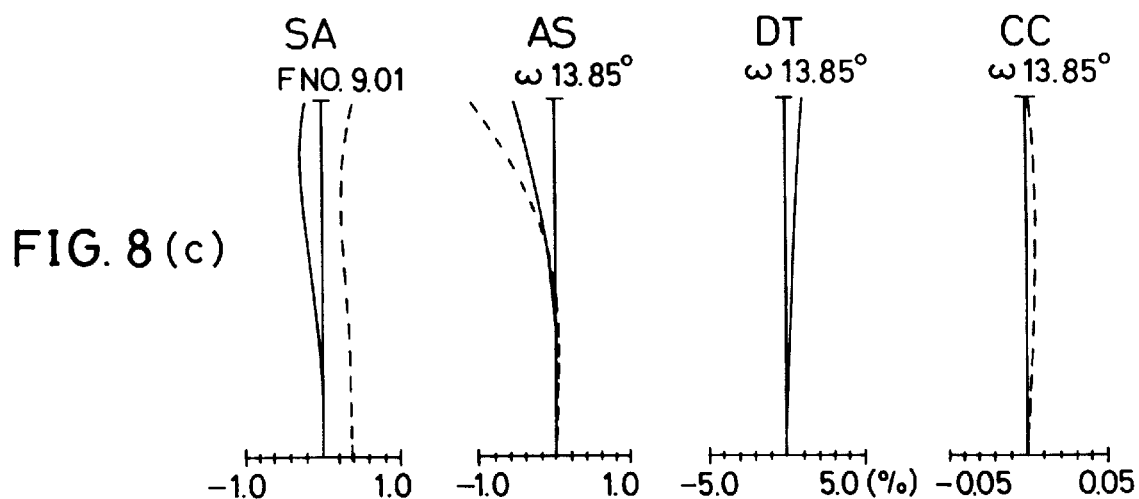
Figure 9A:
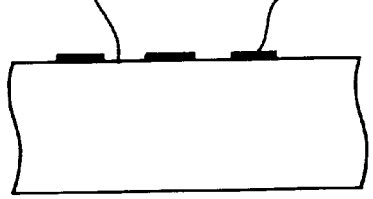
FIGS. 9(a)–9(f) are a sectional views illustrative of one specific shape of the diffractive surface used in the invention.
Figure 9B:
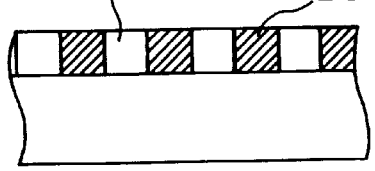
Figure 9C:
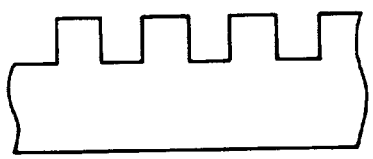
Figure 9D:
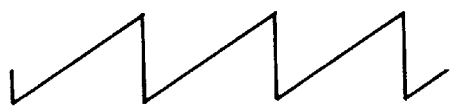
Figure 9E:
Figure 9F:
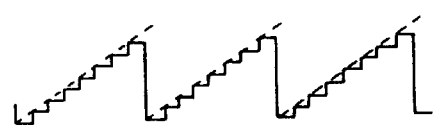

FIGS. 8(a)–8(c) are aberration diagrams of Example 1 at the wide-angle end (a), intermediate settings (b), and telephoto end (c). In FIG. 8, SA, AS, DT, and CC represent spherical aberration, astigmatism, distortion, and chromatic aberration of magnification, respectively.

Set out below are the values of the respective conditions in each example.

| Conditions | Ex. 1 | Ex. 2 | Ex. 3 | Ex. 4 |
|---|---|---|---|---|
| $β_T/β_W$ | 2.06 | 2.44 | 2.79 | 3.21 |
| $v_1-v_2$ | 17.52 | 17.52 | 17.52 | 17.52 |

-continued

| Conditions | Ex. 1 | Ex. 2 | Ex. 3 | Ex. 4 |
|---|---|---|---|---|
| $\Phi_{DOE}$ Lens Diameter/Max. Lens Diameter | | | | |
| 0.0 | −0.0016 | −0.0019 | −0.0020 | −0.0033 |
| 0.2 | −0.0015 | −0.0017 | −0.0019 | −0.0031 |
| 0.4 | −0.0012 | −0.0013 | −0.0016 | −0.0028 |
| 0.6 | −0.0010 | −0.0010 | −0.0012 | −0.0025 |
| 0.8 | −0.0007 | −0.0008 | −0.0010 | −0.0023 |
| 1.0 | −0.0003 | −0.0006 | −0.0008 | −0.0020 |
| $\Sigma d/D$ | 0.66 | 0.67 | 0.65 | 0.67 |

Values for $\Phi_{DOE}$ are given at an ratio interval of 0.2 from the center of the lens to the maximum lens diameter.

As can be appreciated from the foregoing explanation, the present invention makes it possible to provide a compact yet high-zoom-ratio zoom lens system with well-corrected chromatic aberrations. It is also possible to provide a zoom lens system which is inexpensive because of being made up of a small number of lenses and, nonetheless, has a high zoom ratio.

What We claim is:

1. A zoom lens system having a diffractive surface, which comprises, in order from an object side thereof, a positive lens group, a positive lens group, and a negative lens group, said lens groups moving for zooming from a wide angle side to a telephoto side thereof, with a separation between first and second lens groups becoming wide and a separation between second and third lens groups becoming narrow, wherein:

said negative lens group has said diffractive surface therein.

2. A zoom lens system having a diffractive surface, which comprises, in order from an object side thereof, a positive lens group, a positive lens group, and a negative lens group, said lens groups moving for zooming from a wide angle side to a telephoto side thereof, with a separation between first and second lens groups becoming wide and a separation between second and third lens groups becoming narrow, wherein:

at least one lens group has said diffractive surface therein, and satisfies the following condition (1):

$$1.8 < \beta_T/\beta_W < 4.0 \tag{1}$$

where $\beta_T$ and $\beta_W$ are transverse magnifications of said lens group having said diffractive surface at a wide-angle end and a telephoto end of said lens system.

3. The zoom lens system according to claim 1 or 2, wherein said first lens group comprises at least two lenses, and satisfies the following condition (2):

$$15 < \nu_1 - \nu_2 < 25 \tag{2}$$

where $\nu_1$ and $\nu_2$ are Abbe's numbers of lenses forming said first lens group.

4. The zoom lens system according to claim 1 or 2, wherein said diffractive surface satisfies the following condition (3):

$$-0.01 < \Phi_{DOE} < 0 \tag{3}$$

where $\Phi_{DOE}$ is a power of said diffractive surface.

5. The zoom lens system according to claim 4, wherein said diffractive surface satisfies the following condition (4):

$$-0.005 < \Phi_{DOE} < 0 \tag{4}$$

6. The zoom lens system according to claim 1 or 2, which satisfies the following condition (5):

$$0.4 < \Sigma d/D < 1.0 \tag{5}$$

where $\Sigma d$ is a length from a first surface to a final surface, and D is a diagonal length of a film surface.

7. The zoom lens system according to claim 6, which satifies the following (6):

$$0.4 < \Sigma d/D < 0.8 \tag{6}$$

8. The zoom lens system according to claim 1 or 2, wherein said third lens group comprises a single lens.

9. The zoom lens system according to claim 8, wherein said third lens group comprises a plastic lens.

10. The zoom lens system according to claim 8, wherein a lens in said third lens group satisfies the following conditions (7):

$$n_d < 1.65, \nu_d < 50 \tag{7}$$

where $n_d$ is a d-line refractive index of a lens substrate, and $\nu_d$ is a d-line Abbe's number of the lens substrate.

* * * * *